Figure 1:
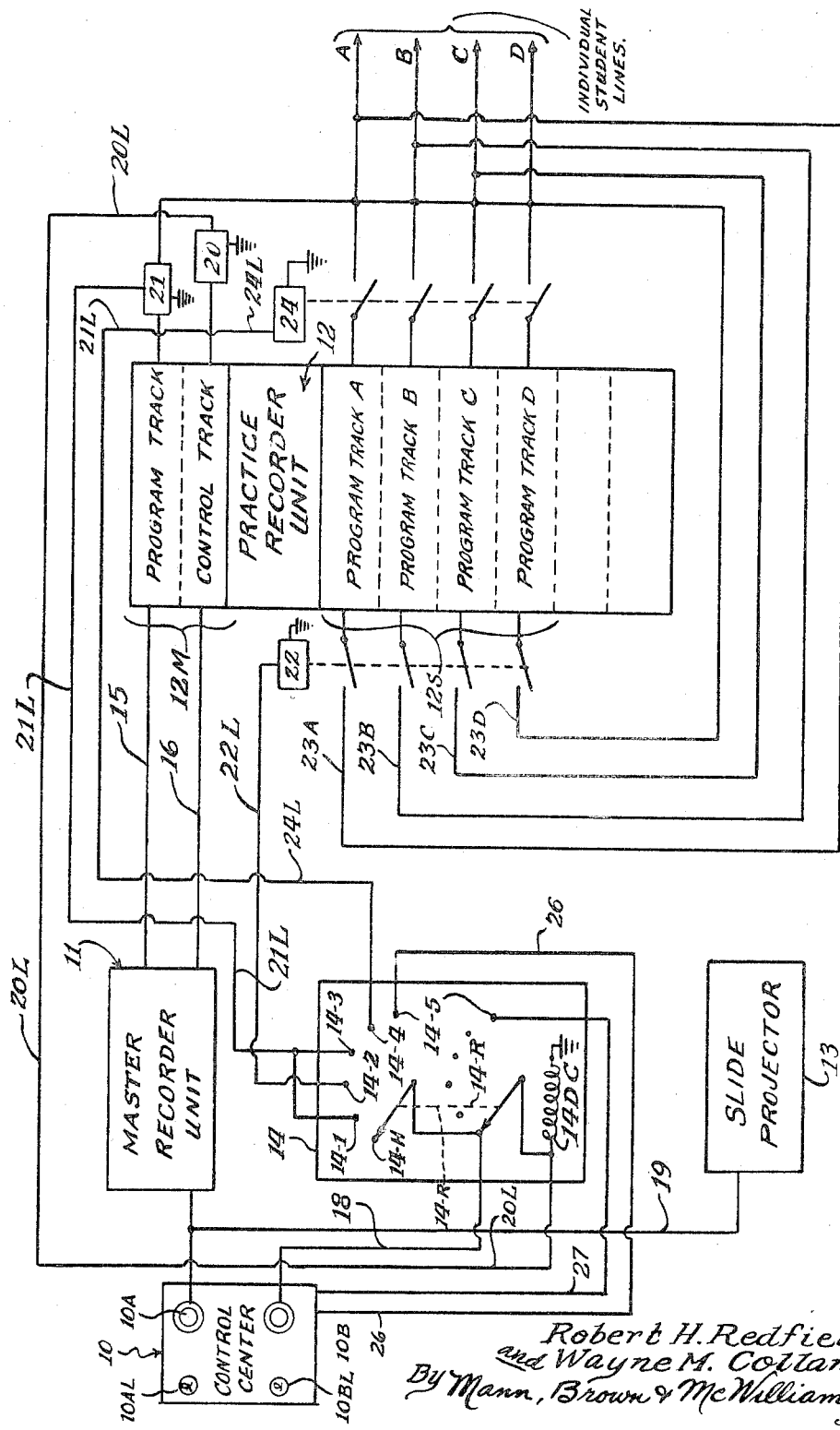

Aug. 30, 1966  R. H. REDFIELD ETAL  3,269,033
AUDIO-VISUAL TEACHING APPARATUS
Original Filed Sept. 20, 1961  6 Sheets-Sheet 1

Robert H. Redfield
and Wayne M. Collander
By Mann, Brown & McWilliams,
Attys.

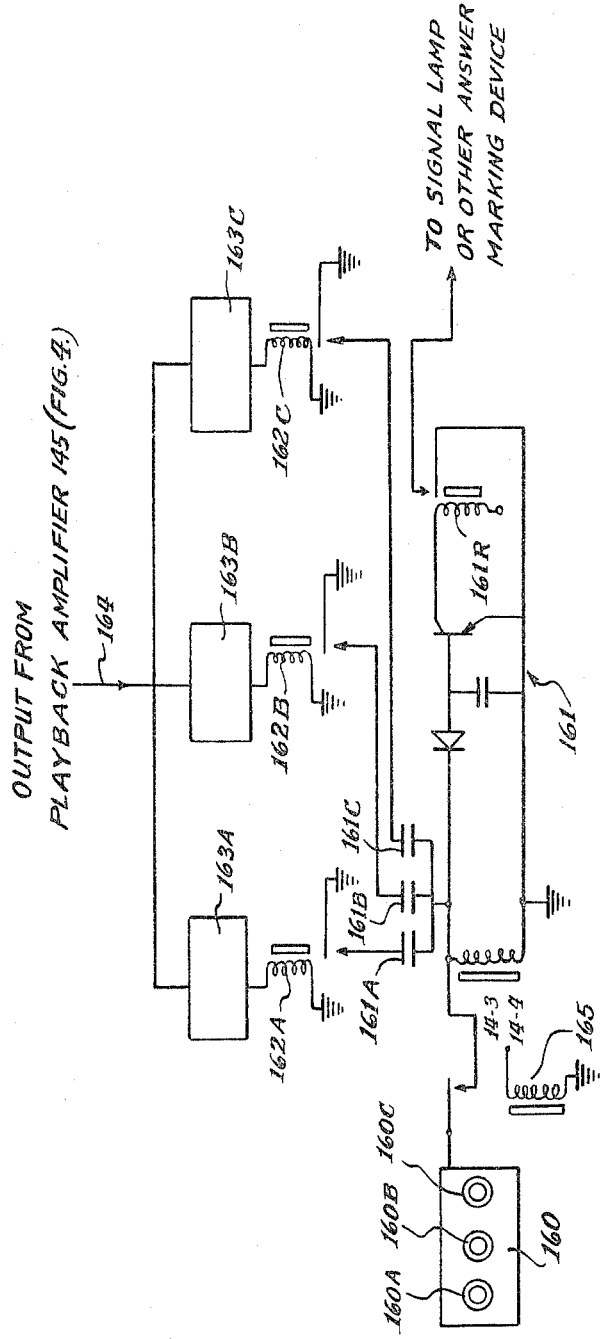

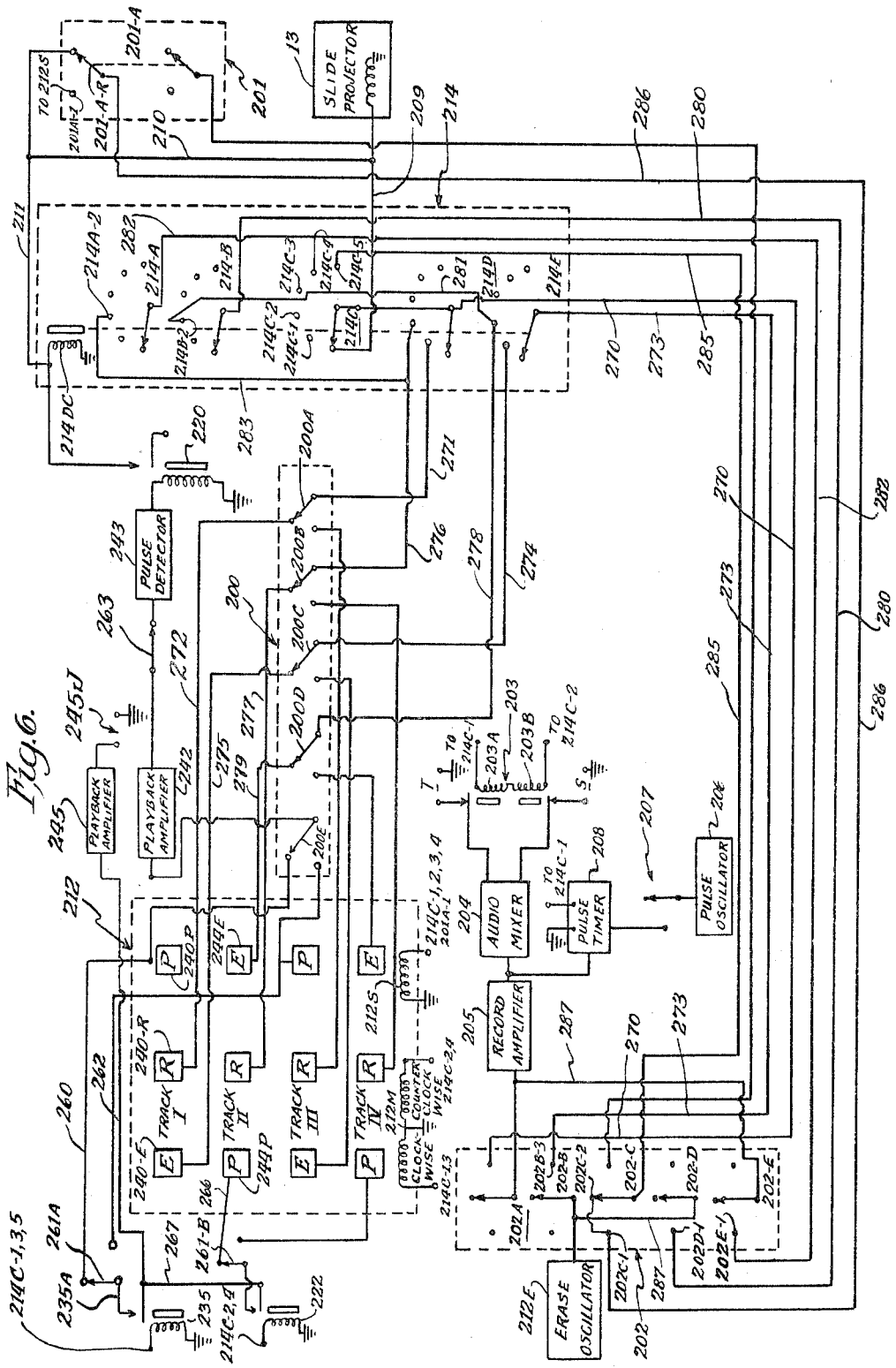

3,269,033
AUDIO-VISUAL TEACHING APPARATUS
Robert H. Redfield, 609 Elmwood Ave., Evanston, Ill., and Wayne M. Collander, 7821 43rd, Lyons, Ill.
Continuation of application Ser. No. 139,409, Sept. 20, 1961. This application Oct. 5, 1965, Ser. No. 505,087
11 Claims. (Cl. 35—35)

This application is a continuation of my copending application, Serial No. 139,409, filed September 20, 1961, and now abandoned.

This invention relates to audio-visual teaching apparatus and it is a principal object of this invention to provide novel audio teaching apparatus for recording and replaying instruction and practice messages and more particularly the invention is concerned with providing multiple channel audio teaching apparatus facilitating simultaneous and individualized verbal drilling of a number of students for use in foreign language training and related fields.

Another object of this invention is the provision of an arrangement utilizing conventional sound recording and playback equipment interconnected and controlled to present a programmed lesson cycle comprised, for example, of transmitting a recorded master message segment to each student to demonstrate correct pronunciation, separately and simultaneously recording each student's response and finally playing back simultaneously to each student the recorded master message segment and the student's recorded response to enable direct comparison by each student.

Still another object is the provision of audio teaching apparatus of the above type having facilities for selective control by the teacher either for advancing from one message segment to another or for replaying a particular message segment where need for additional practice is indicated.

A further object is the provision of an audio teaching apparatus operatively connected with a projector for simultaneously presenting visual displays keyed to the content of the message segments.

The teaching apparatus of this invention is particularly suited for classroom or training center use. Preferably, it is operated to provide the student with correlated sound and sight presentations to facilitate learning by utilizing dual sensory perceptions of seeing and hearing simultaneously.

While the invention has been developed particularly for foreign language training, it will be apparent that it is useful in related teaching fields, dealing with such subject matter as stenography, science, reading, literature, mathematics, dramatics, social studies, physical education, commercial and vocational training. The present apparatus is efficient for repetitive individual drilling of a number of students simultaneously on identical lesson material.

In certain forms the equipment is adapted for question and answer drilling and for multiple choice testing in language or other subject matter.

Other objects and advantages will become apparent during the course of the following description.

Figure 2:
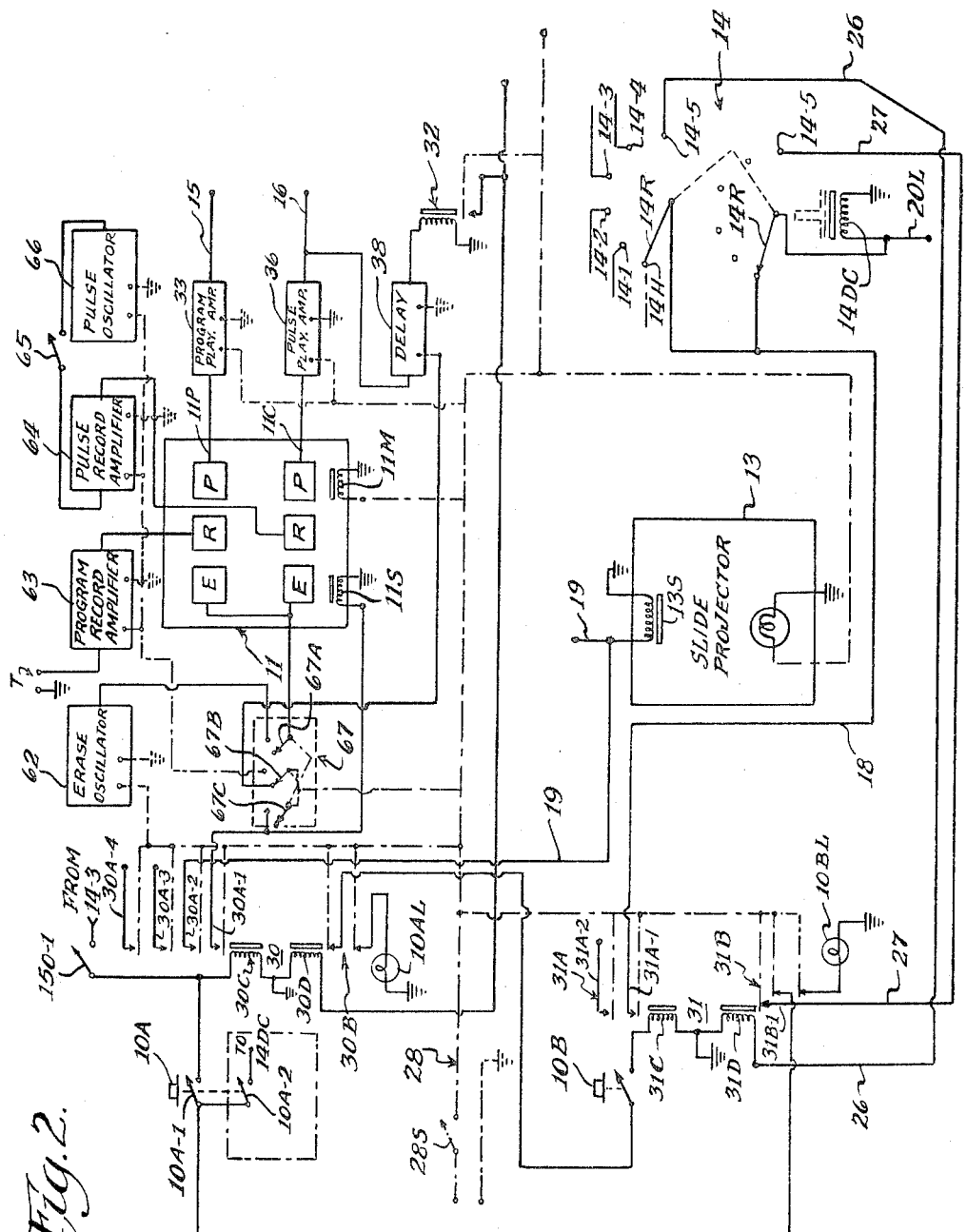
Figure 3:
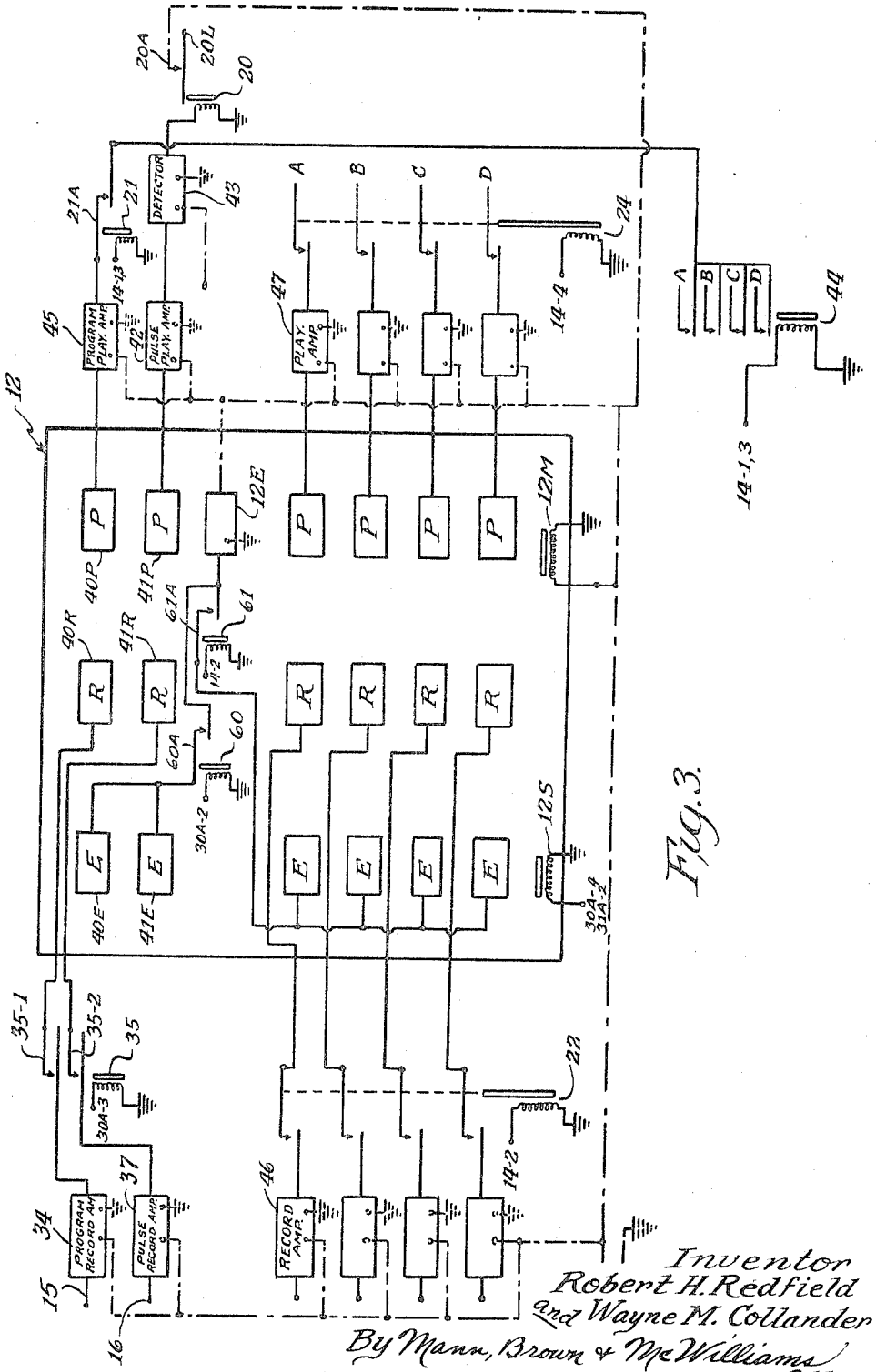
Figure 4:
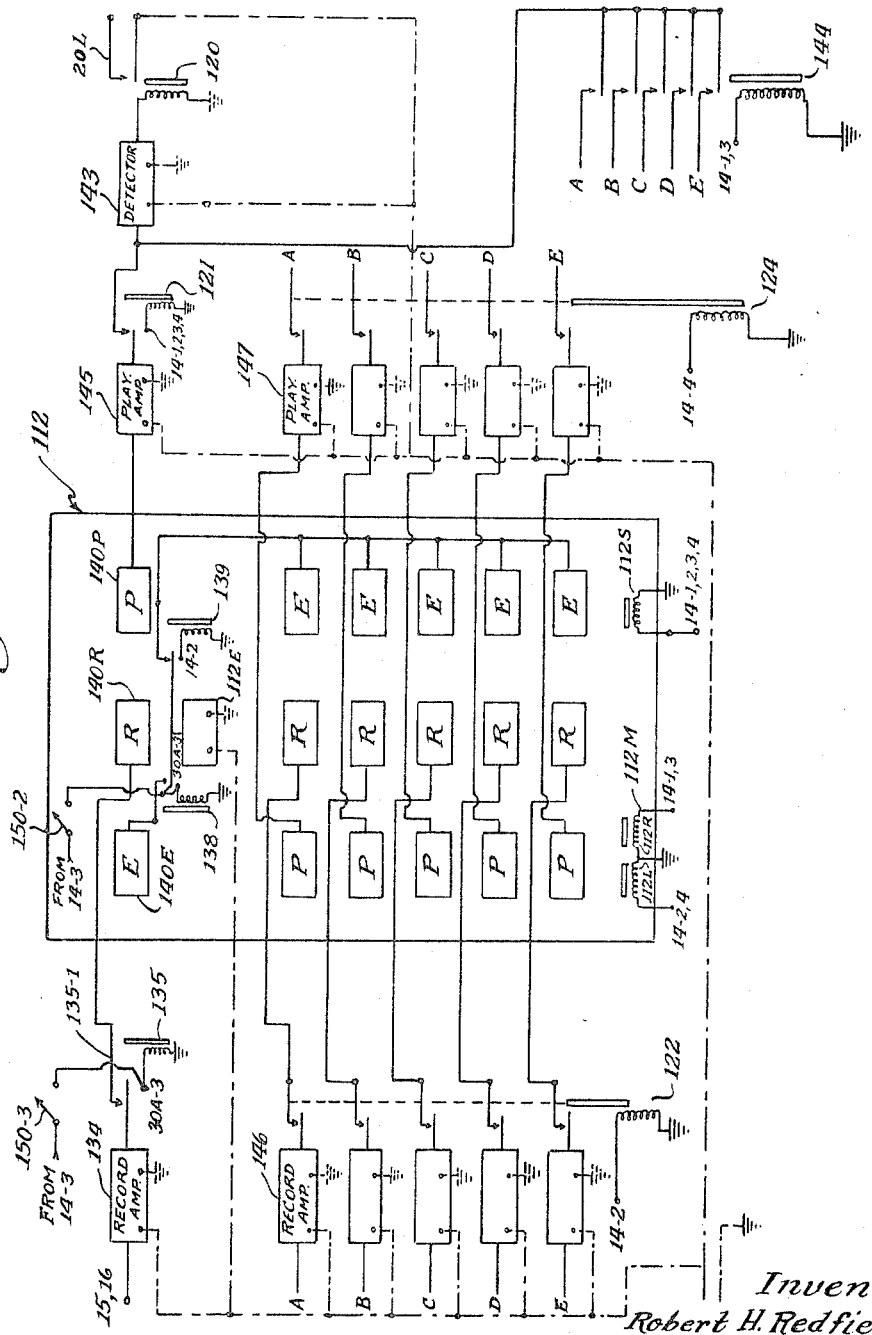

In the accompanying drawings forming a part of this specification and in which like numerals are employed to designate like parts throughout the same;

FIG. 1 is a generalized schematic block diagram illustrating the principal components employed in one form of audio teaching machine of this invention;

FIGS. 2 and 3, taken together with FIG. 2, placed to the left of FIG. 3, constitute a detailed circuit diagram of a class teaching machine utilizing a practice recorder unit of the type having a multiple track endless loop recording tape;

FIGS. 2 and 4, taken together with FIG. 2 placed to the left of FIG. 4, constitute a detailed circuit diagram of a class teaching machine utilizing a practice recorder unit of the type having a multiple track dual direction recording tape;

FIG. 5 is a schematic wiring diagram of a circuit for connection into the circuit of FIGS. 2 and 4 to provide a testing function for the system; and FIG. 6 is a detailed circuit diagram of an integrated individual type of practice recorder unit having a multiple track dual direction recording tape.

*General arrangement*

One form of audio visual teaching machine constructed in accordance with this invention is illustrated in the generalized block diagram of FIG. 1.

The unit includes: a control center 10 located with the teacher and having a set of push buttons 10A and 10B for determining the sequence and timing of the language messages to be presented, a master recorder unit 11 arranged to receive a master tape cartridge having a first track programmed with successive segments of lesson material and a second track programmed with control signals correlated with the successive segments of lesson material, a practice recorder unit 12 having a master record and playback section 12M and a student record and playback section 12S, a slide projector 13 operable from the control center 10 to advance from one slide to another as the master tape unit advances from one message segment to another, and a stepping relay 14 operable to generate a sequence of record and playback functions correlated with the displays of the slide projector.

In the described arrangement, the practice recorder unit 12 is equipped with an endless loop recording tape preferably driven continuously during operation of the unit. The length of the loop is correlated with the length of the individual message segments to be handled. The loop provides a separate program track and control track for the master section and a separate program track for each student line of the student section. As is described in detail in connection with subsequent embodiments, the lesson material and control signals can be applied to a single track both in the master recorder unit 11 and in the practice recorder unit 12.

A teaching, practice, and comparison sequence provided by this system may now be described. The teacher operates push button 10A at the control center 10 to actuate the master recorder unit 11 and the slide projector 13 simultaneously. The slide projector is triggered over line 19 in response to activation of push button 10A. The master recorder unit feeds a recorded message segment over line 15 and a control signal over line 16 to separate tracks provided in the master section 12M of the practice recorder unit 12. The slide projector 13 simultaneously presents a new slide to its projecting lens. Upon completing the recording of the message segment and control pulse in the master section of the practice recorder unit, the equipment becomes passive and a signal light 10AL at the control center indicates to the teacher that the unit is ready for student practice.

The teacher may then operate push button 10B to energize the drive coil 14DC of the stepping relay 14 over line 18 for advancing the stepping relay and initiating a sequence of playback and record cycles. Once push button 10B is operated, the endless recording tape in the practice recorder unit 12 runs continuously and during each cycle of its travel it produces a control signal for advancing the stepping relay to its next position. For this purpose, a control relay 20 is provided to permit control signal supplied from the control track of the master section 12M to trigger the stepping relay 14 for advancing its ganged rotary arms 14R in step-by-step fashion across a series of contacts. The upper rotary arm 14R moves from its home contact 14H to a first position contact 14–1 which is connected to energize a relay 21 over line 21L for completing individual connections from the program track of the master section 12M to each student line A, B, C, D, etc., for playing back to each student the message segment recorded in the master section.

At the end of this message segment, a control signal from the control track in the master section acts through the control relay 20 and line 20L to trigger the drive coil 14DC of the stepping relay 14 and step the rotary arm to contact 14–2 which is connected over line 22L to control a relay 22 for connecting a set of circuits 23A, B, C, and D feeding from each student line to an individual student track provided in the student section of the practice recorder unit 12. Each student then repeats the message segment previously played from the program track of the master section 12M and each student voice is recorded on an individual student track in the student section.

After the students have completed the recording of their voices, the control signal which was originally recorded in the control track of the master section of the recorder unit is again active through the control relay 20 to trigger the drive coil 14DC of the stepping relay 14 to advance its rotary arm to contact 14–3 which is also wired to line 21L from contact 14–1 for again operating the relay 21 for retransmitting to the students the message segment previously recorded on the program track in the master section 12M of the practice recorder unit.

Thereafter, the control signal recorded on the control track in the master section 12M is again active through the control relay 20 to trigger the drive coil 14DC and step the relay arm to contact 14–4 for energizing a relay 24 over line 24L for connecting each student line to each corresponding student track of the practice recorder unit. The individual recordings of the students voices are played back to each student individually to permit each student to compare his response with that of the master message segment. Thereafter, a control signal again triggers the drive coil 14DC to step the relay arm to contact 14–5 and establish a circuit 26 for resetting the control center which then energizes a return line 27 that connects to the lower contact 14–5 and triggers the drive coil 14DC for resetting the stepping relay 14 to its home position. At this point, a signal light 10BL at the control center 10 is turned on to indicate that the full teaching, practice, and comparison cycle has been completed.

Then the teacher either may repeat this cycle by again operating push button 10B or may operate push button 10A to advance the slide projector 13 and to feed another master message and control signal from the master section tape playback unit to the student practice recorder unit. Obviously, the slide projector 13 may be omitted, though a visual display keyed to the language material enhances the effectiveness of this equipment.

*Specific circuitry*

A detailed circuit diagram for the described endless tape type of audio visual teaching machine of FIG. 1 is illustrated for purposes of disclosure in FIGS. 2 and 3. The control center 10 includes separate latching relays 30 and 31, respectively, controlled by each push button 10A and 10B with each relay having a set of normally open contacts 30A and 31A and a set of normally closed contacts 30B and 31B. By way of example, operation of push button 10A energizes relay coil 30C to close the set of contacts 30A and open the set of contacts 30B. Subsequently, the latching relay 30 is restored by energization of coil 30D, this being controlled by a reset relay 32, the operation of which is timed to occur after the master tape playback unit 11 has transmitted one complete message segment to the student practice recorder unit 12.

The master tape playback unit 11 conventionally includes a drive motor 11M that is continuously energized from the main power circuit 28 which is represented in phantom lines for convenience of disclosure with a main switch 28S being provided for supplying power to this circuit. The master tape playback unit 11 also includes a tape run solenoid 11S connected to one of the normally open contacts 30A–1 of the latching relay 30 to drive the tape. The master unit is represented as including a program track 11P connected to feed through a program playback amplifier 33 and over line 15 to a program record amplifier 34 (see FIG. 3). A control relay 35 is energized from a normally open contact 30A–3 of the latching relay to close a contact 35–1 and complete the circuit from the program record amplifier 34 to a program record head 40R for the program track in the master section 12M of the practice recorder unit 12.

A control signal track 11C is also provided in the master unit 11 and feeds through a control signal playback amplifier 36 and over line 16 to a control signal record amplifier (see FIG. 3). Another contact 35–2 of the control relay 35 completes the circuit from the amplifier 37 to a control signal record head 41R in the master section of the practice recorder unit. The control signal playback amplifier 36 (FIG. 2) also transmits a pulse through a delay circuit 38 to control the operation of the relay 32 that resets the latching relay 30. Sufficient delay is provided to insure completion of the recording of the control signal on the control track in the master section of the practice recorder unit.

The multiple track endless tape of the practice recorder unit has two tracks (a program track and a control signal track) for its master section and a number of additional tracks for its student section corresponding to the number of students. The program track in the master section has an erase head 40E, a record head 40R and a playback head 40P operatively associated with it. Correspondingly, the control track in the master section has an erase head 41E, a record head 41R and a playback head 41P operatively associated with it. Similarly each student track has an erase head, a record head, and a playback head. While only four student lines are illustrated herein, it is contemplated that as many as 40 or more can be provided, though obviously there is no limitation as to the number.

Direct lines from the main power circuit 28 are shown connected to the practice recorder unit 12 for energizing its drive motor 12M and its erase oscillator 12E which feeds through a contact 60A of a master section relay 60 to the erase heads 40E and 41E of the program and control tracks which feed through a contact 61A of a student section relay 61 to the erase heads of the student tracks. Relay 60 is connected to a normally open contact 30A–2 of the latching relay 30 and thus applies erase current to erase heads 40E and 41E to clear the program and control tracks immediately prior to the time when a new master message and a new control signal are being recorded. Relay 61 is connected to the second position contact 14–2 of the stepping relay to apply erase current to the erase heads of the student tracks to clear each student track immediately prior to the time when a new student response is being recorded. Finally, a tape run solenoid 12S is shown for the practice recorder unit and it is fed in parallel from one of the normally open contacts 30A of latching relay 30 and from one of the normally open contacts 31A of latching relay 31, such that the practice recorder unit is driven during the master record cycle and then stopped and then is driven throughout the practice cycle.

As described previously, the stepping relay 14 is initiated in its stepping cycle by actuating push button 10B which controls latching relay 31. For this purpose, the home contact 14H for the lower movable arm 14R of the stepping relay is connected to one of the normally open contacts 31A–1 of latching relay 31 and to the drive coil 14DC for this purpose.

Subsequent step-by-step advances of the relay arms 14R are initiated automatically by means of the control relay 20 (FIG. 3) which is triggered each time a control signal is played through the playback head 41P and playback amplifier 42 of the control track for the master section of the practice recorder unit 12. The pulse playback amplifier 42 feeds a pulse detector 43 that is arranged to trip the control relay 20 and close its contact 20A each time a control signal occurs.

Each of contacts 14–1 and 14–3 of the stepping relay 14 is connected to control relays 21 and 44 (FIG. 3). Relay 21 has a contact 21A to complete a path from a program playback amplifier 45, that is fed from the playback head 40P for the program track in the master section of the practice recorder unit, through a set of contacts of relay 44 and then to each individual student line A, B, C, D.

Contact 14–2 of the stepping relay is connected to control a relay 22 for completing individual circuits from the student lines to the corresponding student tracks, each such circuit having a separate student record amplifier 46 feeding a separate student record head. Contact 14–2 also energizes relay 61 for the student section of the practice recorder unit for applying an erase current from the erase oscillator 12E to the erase heads for the student tracks during the time that students are recording their voices. The erase heads remove previously recorded material to clear the way for the present recording.

Contact 14–4 of the stepping relay is connected to energize the relay 24 for completing a circuit from the individual playback heads in the student section of the practice recorder unit, through individual playback amplifiers 47 and then to each student line A, B, C, D. Contact 14–5 of the stepping relay is connected over line 26 to energize relay coil 31D for resetting the latching relay 31 which in turn has one of its normally closed contacts 31B–1 connected to feed through the lower relay arm 14R and the relay drive coil 14DC for resetting the stepping relay 14 to its home contact 14H.

*Alternative input system*

It is desirable to also provide facilities for allowing the teacher to speak directly into the equipment of FIG. 2 for recording master message material. Facilities for this purpose are shown at the top of FIG. 2 and include an erase oscillator 62, a program record amplifier 63, a pulse record amplifier 64 and switch 65, a pulse oscillator 66, and a three-section selector switch 67.

The selector switch 67 which is shown in its left-hand position is thrown to its right-hand position to connect the above named facilities: so that output from the erase oscillator 62 is passed through switch arm 67A to both erase heads of the master recorder unit 11; so that the program record amplifier 63, the pulse record amplifier 64, and the pulse oscillator 66 are energized through switch arm 67B; and so that power is supplied directly to the tape run solenoid 11S through switch arm 67C.

Therefore, as soon as the switch 67 is thrown to its right-hand position the master recorder unit starts to operate and its erase heads remove any previously recorded material. The teacher speaks into a mike connected to the jacks T and the teacher's voice is connected through amplifier 63 to the record head for the master track. At the end of the teacher's message, the teacher operates switch 65 to feed a control signal pulse through amplifier 64 to the record head for the control track. Switch 67 is restored to its left-hand position at the end of the recording of the master message material and the unit may now be used to replay to the practice recorder unit.

*Dual direction type practice recorded unit*

FIGS. 2 and 4, taken as a composite, define a complete audio-visual teaching machine employing a practice recorder unit 112 of the type having a dual direction tape drive.

The dual direction type recorder of FIG. 4 has certain advantages over the endless loop type of FIG. 3. For example, the dual direction type facilitates recording of the master message in the master track of the practice recorder unit and substantially concurrent playback of the master message to the students and this saves class time. In addition, the dual direction recorder is more flexible than the endless loop type in that it can handle message segments of any desired length without lost time.

Many of the components of the dual direction type practice recorder unit 112 of FIG. 4 may be identical to the components used with the endless loop type practice recorder unit 12 of FIG. 3 and in these instances corresponding reference numerals, but in the 100 series, are employed in FIG. 4. A notable difference between the two arrangements shown in FIGS. 3 and 4 is that in FIG. 3 the master section of the practice recorder unit has separate tracks for the master message and for the control signals, whereas in FIG. 4 the equipment connections are arranged so that the control signals will be recorded on the same track with the master message. Moreover, the master track of the practice recorder unit 112 is provided with a prerecorded pulse at its beginning end. The intelligence which is later recorded on it, is transmitted from the master recorder unit 11 and comprises a master message followed by a control signal.

The output lines 15 and 16, respectively, from the program playback amplifier 33 and the pulse playback amplifier 36 of FIG. 2 are connected through a common program and pulse record amplifier 134 (see FIG. 4) to record this intelligence on a common master track of the practice recorder unit. The connection is established through a contact 135–1 of a control relay 135 which is energized when the stepping relay 14 is at its first position contact 14–1.

In the arrangement of FIG. 4, the erase, playback, and record heads 140E, 140P and 140R, respectively, in the master section of the practice recorder unit are arranged in reverse order of the heads in the student section. For example, the tape is driven from left-to-right to record and/or to replay a master message and it is driven from right-to-left to record and/or to replay a student's response. Therefore, in the master section, the tape first passes the erase head 140E to remove any previously recorded message and then passes the record head 140R to record the new message and then passes the playback head 140P to playback almost simultaneous the message that is being recorded and also the control signal.

Correspondingly, in the student section, upon reverse movement of the tape, the tape first moves past the erase heads of the student tracks to remove any previously recorded signals, then passes the record heads to receive the student's responses.

In the tape drive control for the dual direction practice recorder unit, a drive motor is provided having a "right" direction drive winding 112R connected to be energized from contacts 14–1 and 14–3 of the stepping switch and a "left" direction drive winding 112L connected to be energized from contacts 14–2 and 14–4 of the stepping switch 14 (FIG. 2). A tape drive solenoid 112S is also provided and it is connected to be energized from each of contacts 14–1, 14–2, 14–3 and 14–4.

In order that the dual direction recorder may play to the students substantially at the same time that it records the master message in the practice recorder unit, the push button 10A, shown in FIG. 2, is provided with an additional switch arm 10A–2 that directly energizes the drive coil 14DC of the stepping relay when the push button is operated. Therefore, the rotary arm 14R of the stepping relay immediately advances to its first position contact 14–1 at the very beginning of the cycle.

The substantially concurrent playback of the master message to the students is established through a connection made by a relay 121 which is energized when the upper rotating arm 14R of the stepping relay engages contact 14–1. The relay 121 is also energized from any one of contacts 14–2, 14–3 and 14–4. It should be apparent that this same connection arrangement could be employed for the endless loop type of recorder of FIG. 3.

The master message followed by the control signal is fed from the playback head 140P through a playback amplifier 145. When the stepping relay 14 is on either contact 14-1 or 14-3, both relay 121 and 144 are energized to complete the circuit for coupling the master message to the student lines A, B, C, D, E. Correspondingly, the control signal is fed to the pulse detector 143 to trigger control relay 120 and energize the drive coil 14DC for advancing the stepping relay.

While a control signal is provided at the beginning and end of the message and while both control signals are available for replay during each phase of a full cycle of operation of the dual direction recorder, any time a control signal is played at the beginning of a phase, it will not be effective to advance the stepping relay. This results from the fact that the tape in the practice recorder unit is stopped with a control signal in register with the playback head 140P of the master track. Therefore, upon reversal this signal is replayed before the armature controlled by the stepping relay's drive coil can return to its neutral position. The signal occurring at the end of each phase will, of course, be effective to advance the stepping relay to its next position for reversing the direction of drive for the tape.

Operation of dual direction unit

A typical operating cycle for the dual direction type teaching machine may now be traced as follows with reference to FIGS. 2 and 4. The push button 10A for actuating latching relay 30 is operated to energize relay coil 30C through switch arm 10A-1 and close the normally open set of contacts 30A of this relay. Contact 30A-1 completes a circuit to energize the tape drive solenoid 11S for the master recorder unit 11. Concurrently, the other switch arm 10A-2 completes a circuit to energize the drive coil 14DC of the stepping relay and advance its rotary arms to the first position contacts 14-1. In this position, relay 135 is energized to establish a circuit from the master recorder unit 11 to the record head 140R for the master track of the practice recorder unit 112 and relays 121 and 144 are energized to establish a circuit from the playback head 140P of this master track through the playback amplifier 145 to both the pulse detector 143 and the student lines A, B, C, and D. At this same time, the drive motor of the practice recorder unit is operating in a "right" or clockwise sense by winding 112R, the tape drive solenoid 112S has been triggered and the erase oscillator 112E is connected through a contact of relay 138 to the erase head 140E of the master track of the practice recorder unit.

As mentioned previously, this master track of the practice recorder unit has a pre-recorded pulse at its beginning end and the master recorder unit supplies to the master track, a master message followed by a control pulse.

Following the substantially concurrent recording and playback of the master message, this control pulse triggers the pulse detector 143 to energize the relay 120 and energize the drive coil 14DC of the stepping relay for advancing it to its second position contacts 14-2 at which point the drive motor of the practice recorder unit is reversed and operates in a "left" or counterclockwise mode under the control of winding 112L. When contact 14-2 is engaged, a relay 122 is energized to establish a connection from each student line A, B, C, D, E through a student record amplifier 146 to a corresponding student track in the practice recorder unit. Simultaneously, the erase oscillator 112E is connected through a contact of relay 139 to feed erase current to the erase head of each student track to prepare each student track for receiving the student's responses. This phase is terminated when the pre-recorded signal at the beginning of the master track triggers the pulse detector 143 to enerize the relay 120 and energize the drive coil 14DC to advance the stepping relay to its third position.

In the third position, contact 14-3 is energized, the tape is reversed and moves in its original clockwise direction and the master message is played back to the students followed by the control signal to again trigger the pulse detector 143 and energize relay 120 for advancing the stepping relay to its fourth position.

In the fourth position, contact 14-4 is energized, the drive motor again reverses and the recorded response of each student is replayed through playback amplifiers 147 that are provided for each student line. This connection is established by relay 124 shown in FIG. 4. At the end of the replay of each student's response, the control signal from the master track again triggers the pulse detector 143 to advance the stepping relay to its fifth and final position.

In the fifth position, contact 14-5 for the upper rotary arm establishes an energizing circuit to coil 31D of latching relay 31 which is reset to complete a circuit to contact 14-5 for the lower rotary arm and then to the drive coil 14DC to effect a resetting of the stepping relay to its home or off position. At this point, the equipment becomes passive.

A similar sequence for a new master message language drill may be provided by again operating push button 10A to again activate the master recorder unit 11 for supplying a new message followed by a control signal to the master track of the practice recorder unit while substantially concurrently playing the new message to the students and playing the control signal to the pulse detector 143. The same sequence of steps follows automatically under the control of the prerecorded control signal which is retained and the newly recorded control signal. It will be understood that each such master message segment may be of any length within the limits of the tape utilized in the practice recorder unit. It will also be understood that each time push button 10A is operated, the advance solenoid 13S in the slide projector will operate to present a new slide display correlated with the particular master message material currently being fed to the practice recorder unit 112.

Whenever it is desired to repeat a practice drill of a particular master message segment that has been previously recorded and that still remains on the master track, this may be accomplished by operating push button 10B to energize the coil 31C of latching relay 31 and establish a circuit through its contact 31A-1 and line 18 to advance the stepping relay to its first position for replaying the recorded master message and control signal. Erasing of this recorded material on the master track of the practice recorder R unit cannot occur during this repeat cycle since the relay 138 for applying erase current to the erase head 140E is not energized. This relay 138 is picked up only through contact 30A-3 of the latching relay 30.

The remainder of the repeat cycle consists of erasing the previous student message and recording a new one during the second phase and then replaying the master message for the third phase and the student message for the fourth phase. There are several instances apparent in the diagram of FIG. 4 wherein a number of the contacts of the stepping relay 14 of FIG. 2 are indicated as controlling energization of the same relay. This is true, for example, of relays 121, 144, 112S and 112M. It will be understood that provision must be made for isolating these control connections one from the other in order that each contact of the stepping relay may exercise independent control. Appropriate facilities for this can be provided by utilizing a multiple section stepping relay but for simplicity of illustration this detail has not been shown.

Additional functions for dual direction machine

A manual function selector switch having three switch arms 150-1, 150-2 and 150-3 appropriately connected in the composite circuit of FIGS. 2 and 4 is provided to permit adapting this circuit for use as a question and answer device. Those switch arms are connected to become operative during the third phase of the four phase cycle.

The manually operable function switch has its first switch arm 150–1 connected in a circuit leading from the third position contact 14–3 of the stepping relay to provide for automatically reactuating latching relay 30 during the third phase, and this operates the master recorder unit 11 to feed an answer message to the practice recorder unit. This selector switch has its second switch arm 150–2 connected in a separate circuit leading from the third position contact 14–3 for energizing relay 138 to apply erase current to erase head 140E during the third phase and this will remove the signal recorded on the master track during the first phase of operation which was initiated by actuating push button 10A. Finally, the selector switch has its third switch arm 150–3 connected in a circuit leading from the third position contact 14–3 to complete a circuit for energizing relay 135 during this third phase to record new material on the master track of the practice recorder unit and substantially concurrently to play it to the students.

Thus, the composite circuit of FIGS. 2 and 4 operates in the following manner when the function selector switch has its three switch arms 150–1, 150–2 and 150–3 in close position. The cycle of operation is started by push button 10A which advances a slide that may contain a written question for display by the slide projector. Simultaneously, the master recorder unit is actuated to feed a verbal question followed by a control signal from the master recorder unit 11 to the practice recorder unit 112. As described previously, during this first phase, any previously recorded material on the master track is erased and the question message followed by its control signal is recorded on the master track and substantially concurrently is played to the student lines. The control signal triggers the pulse detector 143 to advance the stepping relay 14 and energize its second position contact 14–2 to set up the machine for recording an answer from each student. The control signal that was prerecorded at the beginning end of the master track operates to terminate the student's answer phase by advancing the stepping relay to its third position contact 14–3. In this position, the switch arms 150–1, 150–2 and 150–3 simultaneously connect the previously described circuits to operate the following equipment: the slide projector 13 which then displays a written answer to the question; the erase oscillator 112E is connected to apply erase current and remove the question material from the master track; and, the master recorder unit 11 transmits a correct message followed by a control signal which is recorded on the master track of the practice recorder unit and substantially concurrently played to the students.

The playing of the control signal that followed the answer advances the stepping relay 14 to its fourth position contact 14–4 to replay the student's answer and permit comparison with the correct answer.

*Auxiliary testing circuit for dual direction machine*

When the dual direction machine of FIGS. 2 and 4 is being utilized in the question and answer mode of operation that is provided by means of the selector switch arms 150–1, 150–2 and 150–3 the circuit shown in FIG. 5 may be utilized to provide for testing each student individually and simultaneously.

As is indicated in FIG. 5 the testing circuit arrangement contemplates providing a separate control box 160 for each student, the control box being equipped with a number of push buttons 160A, 160B and 160C as a means of selecting and indicating an answer to a multiple choice question. A tone detector circuit 161 is provided for each student and has a tuned circuit input for receiving and selectively responding to tones transmitted from the student control box 160.

For example, push button 160A may operate to supply a 15 kc. signal to the tone detector circuit 161; push button 160B can supply a 17.5 kc. signal and push button 160C can supply a 20 kc. signal. The input of the tone detector 161 may be tuned to respond selectively to any one of these three frequencies by means of tuning capacitors 161A, 161B and 161C, respectively. Where tuning capacitor 161A is operative and the 15 kc. tone is supplied by operating push button 160A the signal is passed through the detector to operate an output relay 161R and complete a circuit to a signal lamp or other answer marking device at the teacher's console unit. This indicates that the student answered the question correctly. A tone corresponding to an incorrect answer will not be passed through the tone detector circuit 161 and will not produce the required indication at the console.

The tuning capacitors 161A, 161B and 161C are controlled by individual relays 162A, 162B and 162C, respectively. These relays are energized through tone detector circuits 163A, 163B and 163C, respectively, tuned to the freqeuncies 15 kc., 17.5 kc. and 20 kc. These tone detectors have a common input line 164 connected directly to the output from the playback amplifier 145 of FIG. 4.

When this testing circuit of FIG. 5 is used, the message that is transmitted from the master recorder unit comprises a question followed by three possible answers and finally by a control signal. In addition, a tone of either 15 kc., 17.5 kc. or 20 kc. is also present throughout this entire master message phase, it preferably having been prerecorded on the master recorder unit 11. As the master message is recorded on a master track of the practice recorder unit and picked up through the playback head of this track, the continuous tone, which is also present, is recorded and replayed to the tone detectors 163A, 163B and 163C throughout the entire master message phase. Since the tone detectors 163A, 163B and 163C are connected directly to the output from the playback amplifier 145, they will receive the continuous tone from the master track throughout the entire second phase during which the students answers are being recorded. During this second phase or at the end of the first phase, the student must operate one of the pushbuttons on his control box 160 and if he selects the push button corresponding to the correct answer the tone which is transmitted to the detector circuit 161 will be of the frequency to which the input is tuned under the control of the continuous tone which is keyed to the correct answer and a signal lamp or other device will operate.

Since during the third phase the correct answer is played to the students, the testing system must be disabled for both the third and fourth phases. This is accomplished by providing a relay 165 which is connected to be energized when either of the third or fourth position contacts 14–3 and 14–4 of the stepping relay are operative.

*Integrated dual direction type unit*

An integrated or composite type of dual direction tape recorder unit for location at each student station to operate under the control of each student is shown in FIG. 6 wherein the practice recorder unit 212 is shown equipped with a dual direction drive motor arrangement 212M and a tape drive solenoid 212S and is represented as having four tracks merely because existing equipment of this general type is conventionally provided with equipment for four tracks and it is desirable make efficient use of available capacity.

Track I is a master track that works in conjunction with track II which is a student track. After the full lengths of tracks I and II have been used up, a four-section track selector switch 200 is thrown to the left to connect tracks III and IV in the configuration previously established with respect to tracks I and II. This selector switch 200 is illustrated in its right-hand position wherein it selects tracks I and II and only operations for this position will be described as it will become apparent that the functioning in its right-hand position as respects tracks III and IV is identical.

In FIG. 6 a five-section stepping relay 214 is illustrated and its function corresponds generally to that of the stepping relay 14 shown in FIG. 2 and, in addition, it incorporates other features that will be described.

A two-section subject selection switch 201 is shown in its right-hand position in which it permits any of the functions as recording, re-recording, or playback. The subject selection switch 201 can be thrown to its left-hand position for controlling the machine to shift to a new section of tape; this left-hand position may be termed the new subject position. Finally, a five-section function selector switch 202 is provided and is shown in its play position. It may be thrown to the right to a record position or to the left to a re-record position.

A differential relay 203 is provided with a drive coil 203A for establishing an audio input connection from the console to the circuit of FIG. 6 and is provided with a coil 203B for establishing an audio input connection from a student mike. Depending upon which of these coils is operated, audio from either the console (see connection jacks T) or the student mike (see connection jacks S) is fed through an audio mixer 204, a record amplifier 205, and then to the first section 202A of the function selector switch 202. A pulse oscillator 206, pulse record switch 207, and pulse timer 208 are provided for applying control signals to the master track at the end of each master message. It should be understood that the teacher has an identical machine to that shown in FIG. 6 and it is connected to feed into the jacks T at each student station. Where the teacher supplies the master message, the teacher also operates the switch 207 at the teacher unit to feed a control signal to each student machine.

It is contemplated that the student mike might also be switched to feed the connection jacks T where it is desired to feed a master message from the student station. In this situation the student will operate switch 207 to feed a control signal to the master track following the master message.

*Replay operation*

The numerous switches as illustrated in FIG. 6 are positioned to connect the unit for replaying a tape that already has on its master track, track I, a control signal pulse followed by a master message, followed by a control signal pulse, and that already has on its student track, track II, a control signal pulse followed by a student message, followed by a control signal pulse.

To initiate the replay operation, a main power switch is turned on to connect the power to all of the units illustrated in FIG. 6. The stepping relay 214 has its drive coil 214DC energized through a circuit that includes wires 209, 210 and 211 and that is completed through the home contact of its third section 214C and this steps the rotary arms of each of its sections to their first position. The first position contact 214C–1 of the third section 214C of this stepping relay is connected to the tape drive solenoid 212S and is also connected to the terminal for the clockwise drive motor winding to drive the tape in a direction to replay the master message and control signal that is recorded on it. This contact 214C–1 is also connected to pick up a relay 235 and close its normally open contact arm 235A to establish a connection from the playback head 240P of track I over wire 260, switch arm 261A, and wire 262 to a playback amplifier 245, the output of which is equipped with jacks 245J for connecting audio to a student headphone (not shown). A separate playback amplifier 242 is also connected to playback head 240P through switch arm 200E and provides output that is fed through a switch 263 to a pulse detector 243 which is responsive to a control signal pulse at the end of the master message to trip a relay 220 for applying power to the drive coil 214DC of the stepping relay and advancing it to its second position.

The second position contact 214C–2 of the third section of the stepping relay is connected to energize a relay 222 for establishing a path from the playback head 244P of track II over wire 266, switch arm 261B and wires 267 and 262 to feed the student massage and control signal pulse through the playback amplifier 245. This second position contact is also connected to the tape drive solenoid 212S and to the terminal counterclockwise drive motor winding for driving the tape towards its intial position. The control signal pulse recorded on the beginning end of track II is played back through the playback amplifier 245 and detected by the pulse detector 243 to trip the relay 220 that controls energization of the drive coil 214DC for the stepping relay and thereby advance it to its third position.

The third position contact 214C–3 of the third section of the stepping relay is connected to control the same points as the first position contact and thus causes another replay of the master message and control signal at the far end of track I for automatically advancing the stepping relay 214 to its fourth position.

The fourth position contact 214C–4 is connected to control the same points as the second position contact 214C–2 for again replaying the student's response message and control signal after which the stepping relay is automatically advanced to its fifth position. The fifth position contact 214C–5 of the third section of the stepping relay is connected through a center position contact 202C–2 for the third section 202C of the play record selector switch 202 and this contact is in turn connected through the switch arm 201A–4 for the first section 201A of the subject selector switch 201 and through wire 211 to energize the drive coil 214DC of the stepping relay and reset it to its home position. From this point, the stepping relay would automatically advance to its first position to repeat the cycle. This sequence may be changed as desired by appropriately operating any one or more of the various selector switches that are provided.

*Record cycle*

To set the device for recording master and student messages on the appropriate tracks of the tape, the five section function selector switch 202 is moved to the right to connect its arms in what may be defined as their record position. The subject selector switch 201 remains in its right-hand position as illustrated.

When power is turned on, the drive coil 214DC of the stepping relay is energized through the home contact of the third section 214C of the stepping relay to advance the rotary arms to their first position. In this position, the drive motor is operating clockwise. First position contact 214C–1 is connected to energize the relay coil 203A and thus the audio line T from the teacher's console is connected through the audio mixer 204 and recording amplifier 205 to feed over wire 270, through the rotary arm and through the first position contact 214D–1 of the fourth section of the stepping relay and then over wire 271, switch arm 200A, and wire 272 to the record head 240R for track I. Concurrently the relay 235 is energized to connect the playback head 240P for track I to the playback amplifier 245 over lines 260 and 262 to transmit the message to the students jacks 245J. Playback amplifier 242 is continuously connected for feeding control signals from the master track (track I) to the pulse detector 243.

To prepare the tape for recording the message and control signal, the erase oscillator 212E is connected to the erase head 240E of track I through a circuit comprising the rotary arm of the second section 202B of the function selector switch, contact 202B–3, wire 273, the rotary arm of the fifth section 214E of the stepping relay, contact 214E–1 wire 274, switch arm 200C and wire 275.

The control signal pulse fed in at the end of the master message is played through amplifier 242 to trigger the pulse detector 243 to energize relay 220 for applying power to the drive coil 214DC of the stepping relay which is then advanced to its second position. In this position the drive motor is operating counterclockwise. The second position contact 214C-2 energizes the relay coil 203B to connect an audio line S from the student's mike to the audio input system. The student message is fed through the record amplifier 205 to wire 270 and through the second position contact 214D-2 of the fourth section of the stepping relay, wire 276, switch arm 200B, and wire 277 to the record head 244R for the student track (track II). To prepare the tape for recording the students message the erase oscillator is connected to the erase head 244E through an obvious circuit that includes wire 273, contact 214E-2, wire 278, switch arm 200D and wire 279.

As the tape returns to its starting position the pre-recorded pulse on the master track (track I) is fed through playback amplifier 242 to trip the pulse detector 243 and again advances the stepping relay to its third position. It may also be observed that while the student's response message is being recorded, it is also being played back to the student, the relay 222 being energized for this purpose, while the stepping relay is at its second position.

In the third position of the stepping relay, the drive motor is again operating clockwise and relay 235 is energized to connect the playback head 240P for track I to the playback amplifier 245 for repeating the master message to the student. Once again playback amplifier 242 feeds the control signal pulse to trigger the pulse detector 243 after the master message is completed and advance the stepping relay to its fourth position. In this fourth position, the tape drive motor 212M is operating counterclockwise, to return the tape towards its starting position, and the playback head 244P for the student track (track II) is connected to the playback amplifier 245. The pre-recorded pulse at the starting position on track I is again played through the playback amplifier 242 to trigger the pulse detector 243 and advance the stepping relay to its fifth position and at this point the unit becomes passive.

If desired, the two section subject selector switch 201 may now be turned manually to its new subject position, that is, to the left, and this will apply power through contact 201A-1 to the tape drive solenoid 212S and to the clockwise drive motor winding to advance the tape from its starting position, to which it had returned and remained, towards a new position at the opposite end of the portion on which the master message has just been recorded. Contact 201A-1 may also be connected to energize relay 235 to replay the master message to the student. Whether or not the first master message is repeated during this interval, control pulse is always played through playback amplifier 242 to trigger the pulse detector 243 to energize the drive coil 214DC of the stepping relay and reset it to its home position whereupon the drive coil 214DC is immediately retriggered to automatically advance to the first position to again energize the tape drive solenoid and the clockwise drive motor winding and to connect audio from the teacher's console to the audio input circuit and then to the record head on track I for recording a second master message followed by another control signal pulse. Once again the control signal may be fed in by manually controlling switch 207.

This pulse triggers the pulse detector 243 to sequence the equipment for recording another student message. The pulse injected at the end of the first master message is played through playback amplifier 242 at the end of the student message on the second portion of the tape and triggers the pulse detector 243 to sequence the equipment and replay the second master message and thereafter the pulse detector 243 is again triggered by the control signal at the end of the second master message to replay the second student's response. The subject selector switch 201 then takes over again to advance to a new portion of the tape. So long as the subject selector switch remains in its new subject position, the sequence already described will be repeated at each new portion along the tape and in this way the full length of the tape may be provided with master message recordings on track I and student response recordings on track II.

A final function which is also built into the equipment arrangement illustrated in FIG. 6 is concerned with the situation wherein it is desired to record only a new set of student responses on a tape that already has both master messages and student responses recorded on it.

During this re-record cycle no erase or record signals are fed to the master track (track I) but erase signals and a new student response message are fed to the student track (track II). To control erase of previously recorded student messages, the fourth section 202D of function selector switch 202 has its switch arm connected to the erase oscillator 212E and has its left hand contact 202D-1 connected by a wire 280 which leads to the switch arm for the second section 214B of the stepping relay. When the stepping relay is in its second position this circuit is completed by a wire 281 from contact 214B-2 to contact 214E-2 and then over wire 278, switch arm 200D and wire 279 to erase head 244E. To control re-record of the student, the fifth section 202E of the function selector switch has its switch arm connected to the audio input record amplifier 205 and has its left hand contact 202E-1 connected by a wire 282 which leads to the switch arm for the first section 214A of the stepping relay. When the stepping relay is in its second position, this circiut is completed by a wire 283 from contact 214A-2 to contact 214E-2, and then over wire 276, switch arm 200B and wire 277 to the record head 244R.

Assuming this re-record function is selected following completion of a record cycle which concludes with the stepping relay 214 stopped at its fifth position and with the subject selection switch in its right-hand position, the five position function selector switch 202 is turned to its left-hand position.

Under these circumstances, power is supplied through the switch arm for the third section 214C of the stepping relay which at this point is connected to contact 214C-5 and is connected over wire 285 to the switch arm for the third section 202C of the function selector switch 202 and then through its left-hand contact 202C-1 and over wire 286 to the switch arm 201A-R of the subject selection switch which is connected to energize the drive coil 214DC of the five section stepping relay. This advances the stepping relay to its home position and at this position the drive coil 214DC is immediately triggered through a power supply circuit beginning with the switch arm of the third section of the stepping relay and including wires 209, 210 and 211 and this advances the stepping relay to its first position to drive the tape in a direction to replay the master message recorded on the track I. During this first phase of the tape movement erase current is not applied to the master track nor is the audio input circuit connected to the record head of the master track.

The control signal already present on the master track is ultimately played through the playback amplifier 242 and sensed by the pulse detector 243 to retrigger the drive coil 214DC and advance the stepping switch to its second position. In this position, a new student message is fed through the audio input circuit and from the record amplifier passes over wire 287 to the switch arm of the fifth section 202E of the function selector switch and then through its left-hand contact 202E-1 and over wire 282 to the switch arm of the first section of the stepping relay and through contact 214A-2 and wire 283 to wire 276, switch arm 200B and wire 277 to the record head for the student track (track II). Concurrently, erase current is supplied from erase oscillator 212E over wire 287 through switch arm 202D, contact 202D-1, wire 280, the switch arm of the second section of the stepping relay, contact 214B–2, wires 281 and 278, switch arm 200D and wire 279 to the erase head 244E. During this same interval, the message being recorded on the student track is also played back through the playback amplifier 245 while the control signal on the master track is played through playback amplifier 242 to trigger the pulse detector 243 to trip the drive coil 214DC and advance the stepping relay to its third position.

In the third position the master message is replayed and the stepping switch is advanced to its fourth position wherein the new student message is replayed. The functioning of the circuit when the stepping relay is in its third and fourth positions should be apparent.

It should be understood that the description of the preferred form of the invention is for the purpose of complying with Section 112, Title 35, of the U.S. Code and that the claims should be construed as broadly as prior art will permit.

What is claimed is:

1. A practice teaching machine comprising a practice recorder unit having a recording medium provided with a master track section and a student track section in side by side relation, with the student track section having a beginning point at the end point of the master track section and with the master track section having a beginning point at the end point of the student track section, a sequencing device connected to control said practice recorder unit, means for recording a master message and a control signal in the master track section of said practice recorder unit, means concurrently operable for playing back said master message and said control signal from the master track section of said practice recorder unit to actuate said sequencing device, means responsive to actuation of said sequencing device for connecting said practice recorder unit to receive and record a practice message in the student track section and for again playing back said recorded control signal to actuate said sequencing device, means thereupon responsive to actuation of said sequencing device for playing back said recorded master message from said practice recorder unit to and for playing back said recorded control signal to again actuate said sequencing device, and means thereupon responsive to actuation of said sequencing device for playing back said recorded student message from said practice recorder unit, and for playing back said control signal to actuate said sequencing device, and means responsive to the last-mentioned actuation of said sequencing device for resetting the sequencing device for another cycle of operation.

2. A practice teaching machine comprising a master recorder unit having a track with a programmed set of master messages and a track with a programmed set of control signals correlated with said master messages, a practice recorder unit having a master message track, a control signal track and at least one student message track with the student message track having a beginning point at the end of the master message track and with the master message track having a beginning point at the end of the student message track, student transmitting and receiving equipment, a sequencing circuit connected between and selectively controlling communication between said student equipment and said tracks of said practice recorder unit, a control unit having first and second control switches, said first control switch being connected to operate said master recorder unit for recording a master message and a corresponding control signal on said master message track and control signal track respectively, said second switch being connected to initiate operation of said sequencing circuit for establishing a connection for playing back said master message track to said student equipment and for playing back said control signal track to reactuate said sequencing circuit and thereupon connect said student message track for recording a student message from said student equipment and for again playing back said control signal track to reactuate said sequencing circuit and thereupon connecting said master message track for playback to said student equipment and for playing back said control signal track to reactuate said sequencing device and thereupon play back said student message track to said student equipment.

3. A practice teaching machine comprising a practice recorder unit having an endless loop recording medium and a unidirectional drive for continuously moving said medium, means for recording a master message and a control signal in successive relation on said medium, means for successively playing the master message and the control signal during a first cycle of movement of said medium, means operable in response to playing of the control signal for recording a student message and for replaying the control signal during a second cycle of movement of said medium, means operable in response to replaying of the control signal for replaying the master message and the control signal during a third cycle of movement of said medium, and means operable in response to the last-named replaying of the control signal for playing the student message and again replaying the control signal during a fourth cycle of movement of said medium.

4. A practice teaching machine comprising a practice recorder unit having a recording medium provided with a master track section and a student track section in side by side relation, with the student track section having a beginning point at the end point of the master track section and with the master track section having a beginning point at the end point of the student track section, student transmitting and receiving equipment, a sequencing device for controlling said practice recorder unit, a detector connected to actuate said sequencing device, means for recording a first control signal, a master message, and a second control signal in the master track section of said practice recorder unit, means concurrently operable for playing the master message from the master track section of the practice recorder unit to the student equipment and for playing the second control signal from the master track section of the practice recorder unit to the detector for actuating the sequencing device, means responsive to actuation of said sequencing device for connecting said student equipment to record a student message in the student track section of said practice recorder unit and for playing the first control signal from the master track section of the practice recorder unit to the detector for again actuating the sequencing device, means responsive to the last named actuation of said sequencing device for replaying the master message from the practice recorder unit to the student equipment and for replaying the second control signal from the practice recorder unit to the detector for again actuating the sequencing device, and means responsive to the last mentioned actuation of said sequencing device for playing the student message from the practice recorder unit to the student equipment and for replaying the first control signal from the practice recorder unit to the detector for actuating the sequencing device and complete its cycle of operation.

5. A practice teaching machine comprising a practice recorder unit having a recording medium and a dual direction drive for said medium, said medium being provided with a first control signal, a master message, and a second control signal in successive relation, a sequencing device for controlling said practice recorder unit, a control signal detector connected to actuate said sequencing device, student transmitting and receiving equipment, means operable when said drive moves said recording medium in one direction for playing the master message from the practice recorder unit to the student equipment and for playing the second control signal from the practice recorder unit to the detector for actuating the sequencing device to reverse said drive and move said recording medium in an opposite direction, means responsive to actuation of said sequencing device and operable when said drive moves said recording medium in said opposite direction for connecting said student equipment to record a student message in said practice recorder unit and for playing the first control signal from the practice recorder unit to the detector for again actuating the sequencing device to reverse said drive and move said recording medium in said one direction, means responsive to the last named actuation of said sequencing device and operable when said drive moves said medium in said one direction for replaying the master message from the practice recorder unit to the student equipment and for replaying the second control signal from the practice recorder unit to the detector for again actuating the sequencing device to reverse said drive and move said recording medium in said opposite direction, and means responsive to the last mentioned actuation of said sequencing device and operable when said drive moves said medium in opposite direction for playing the student message from the practice recorder unit to the student equipment and for replaying the first control signal from the practice recorder unit to the detector for actuating the sequencing device and complete its cycle of operation.

6. A practice teaching machine comprising a practice recorder unit having a recording medium and a dual direction drive for said medium, said medium being provided with a first control signal, first and second means respectively operable while moving said medium in one direction for recording a master message and a second control signal on said medium in successive relation to said first control signal and for immediately playing the master message and the second control signal from said medium, means responsive to playing of said second control signal from said medium for reversing said drive to move said medium in an opposite direction and operable while said medium is moving in an opposite direction for recording a student message on said medium at a location alongside the master message thereon and for playing the first control signal from said medium with said master message on said medium having a beginning point at the end of the student message on said medium and with the student message on said medium having a beginning point on said medium at the end of said master message, and means responsive to playing of said first control signal from said medium for reversing said drive to move said medium in said one direction.

7. A practice teaching machine comprising a practice recorder unit having a recording medium and a dual direction drive for said medium, said medium being provided with a first control signal, student transmitting and receiving equipment, selector means automatically responsive for controlling connection of said practice recorder unit to said student equipment, means for initiating said drive to advance said medium in one direction, first and second means responsive to said selector means to operate while said medium is moving in said one direction, said first means being operable for recording a master message and a second control signal on said medium in successive relation to the first control signal and said second means being operable for playing the master message from the practice recorder unit to the student equipment and for playing the second control signal from the practice recorder unit to the selector means for actuating the same, means responsive to actuation of said selector means by said second control signal for reversing said drive to move said medium in an opposite direction and including means operable while said medium moves in said opposite direction for connecting said student equipment to said recorder unit to record a student message on said medium at a location alongside the master message thereon and means for playing the first control signal from the practice recorder unit with said master message on said medium having a beginning point at the end of the student message on said medium and with the student message on said medium having a beginning point on said medium at the end of said master message, and means responsive to the playing of one of said control signals representing the completion of a prescribed recording playback sequence and operable to actuate said drive to advance said medium in said one direction and to actuate the said first and second means for recording and replaying a second master message and third control signal on a new section of said medium.

8. A practice teaching machine for connection to a master recorder unit for supplying a programmed set of master messages and corresponding control signals and for connection to student transmitting and receiving equipment and comprising a practice recorder unit having a recording medium and a dual direction drive for said medium, said medium being provided with a first control signal, selector means automatically responsive for controlling connection of said master recorder unit to said practice recorder unit and for controlling connection of said practice recorder unit to said student equipment, and control means operable to initiate said master recorder unit and said selector means concurrently to operate said drive for moving said recording medium in one direction while recording a first master meassage and a second control signal on said medium, said selector means including means operable while said medium is moving in said one direction for connecting said practice recorder unit to play said master message to said student equipment and to play a control signal to said selector means for actuating the same, means thereupon responsive to reverse said drive and operable while said medium is moving in an opposite direction for connecting said practice recorder unit to record on said medium at a location alongside the master message thereon a student message from said student equipment and to play said first control signal from said medium to said selector means for actuating the same, means thereupon responsive to again reverse said drive and operable while said medium is again moving in said one direction for connecting said practice recorder unit to erase said master message and control signal and substantially concurrently to feed a new master message and control signal from said master recorder unit for recording on said medium and for replay of the message to said student equipment and for replay of the control signal to said selector means to actuate the same, and means thereupon responsive to reverse said drive and operable while said medium is again moving in said opposite direction for connecting said practice recorder unit to play said student message to said student equipment and to play a control signal to said selector means to complete the cycle of operation.

9. A practice teaching machine for connection to student transmitting and receiving equipment and comprising a practice recorder unit, selector means connected between and selectively controlling communicating between said practice recorder unit and said student equipment, and control means operable to initiate recording of a master message and corresponding control signal in said practice recorder unit, said selector means including means for connecting said practice recorder unit to play said master message to said student equipment and to play a control signal to said selector means and actuate the same, means thereupon responsive for connecting said practice recorder unit to said student equipment to receive and record a student message and to play a control signal to said selector means, and means for testing the student and including means for playing a coded signal into the practice recorder unit concurrently with and correlated with a master message, means for replaying the coded signal concurrently with recording of a student message, means operable by a student for selecting a coded signal for matching with the first named coded signal and means responsive when concurrently subjected to a pair of coded signals for producing an indication.

10. A practice teaching machine comprising a practice recorder unit, said practice recorder unit having a recording medium provided with a master track section and a student track section in side by side relation, with the student track having a beginning point at the end point of the master track section and with the master track section having a beginning point at the end point of the student track section, and said practice recorder unit having a drive for said medium operable to move each track section in sequence from its beginning point to its end point, student transmitting and receiving equipment, a sequencing device, a detector connected to actuate said sequencing device, means for recording control signal and master message intelligence on said master track section, means operable when said drive moves said recording medium in a direction to transport the master track section from its beginning point to its end point for playing the master message thereon to the student equipment and for playing control signal intelligence thereon to the detector for actuating the sequencing device to then operate said drive and move said recording medium in a direction to transport the student track section from its beginning point to its end point, means responsive to actuation of said sequencing device and operable while said drive is thus transporting the student track section for connecting said student equipment to record student message intelligence in said student track section and for playing control signal intelligence on said medium to the detector for again actuating the sequencing device to then operate said drive for transporting said recording medium to again transport the master track section from its beginning point to its end point, means responsive to the last named actuation of the sequencing device and operable while said drive is thus transporting the master message section for replaying the master message intelligence to the student equipment and for replaying control signal intelligence to the detector for again actuating the sequencing device to operate said drive for moving said recording medium to transport said student track section from its beginning point to its end point, and means responsive to the last mentioned actuation of said sequencing device and operable when said drive is thus transporting said student track section for playing the student message intelligence to the student equipment and for replaying control signal intelligence to the detector for actuating the sequencing device to complete a cycle of operation.

11. A practice teaching machine comprising a practice recorder unit, said practice recording unit having a recording medium provided with a master track section and a student track section in side by side relation, with the student track section having a beginning point at the end point of the master track section and with the master track section having a beginning point at the end point of the student track section, and said practice recorder unit having a drive for said medium operable to move each track section in sequence from its beginning point to its end point, student transmitting and receiving equipment, a sequencing device, a detector connected to actuate said sequencing device, means for recording a first control signal, a master message, and a second control signal in successive relation on said master track section, means operable when said drive moves said recording medium in a first direction to transport the master track section from its beginning point to its end point for playing the master message thereon to the student equipment and for playing control signal intelligence thereon to the detector for actuating the sequencing device to then reverse said drive and move said recording medium in an opposite direction to transport the student track section from its beginning point to its end point, means responsive to actuation of said sequencing device and operable while said drive is thus transporting the student track section for connecting said student equipment to record student message intelligence on said student track section and for playing control signal intelligence on said medium to the detector for again actuating the sequencing device to then reverse said drive for transporting said recording medium in said first direction to again transport the master track section from its beginning point to its end point, means responsive to the last named actuation of the sequencing device and operable while said drive is thus transporting the master message section for replaying the master message intelligence to the student equipment and for replaying control signal intelligence to the detector for again actuating the sequencing device to reverse said drive for moving said recording medium in said opposite direction to again transport said student track section from its beginning point to its end point, and means responsive to the last mentioned actuation of said sequencing device and operable when said drive is thus transporting said student track section for playing the student message intelligence to the student equipment and for replaying control signal intelligence to the detector for actuating the sequencing device to complete a cycle of operation.

References Cited by the Examiner

UNITED STATES PATENTS

| | | |
|---|---|---|
| 2,514,578 | 7/1950 | Heller et al. |
| 2,876,561 | 3/1959 | Horne _____ 35—35.3 |
| 2,892,040 | 6/1959 | Johnson et al. _____ 35—35.3 X |
| 3,059,348 | 10/1962 | Mezzacappa _____ 35—35.3 |

FOREIGN PATENTS 730,664    5/1955    Great Britain.

EUGENE R. CAPOZIO, *Primary Examiner.*